United States Patent [19]

Bertolacini et al.

[11] Patent Number: 4,784,980

[45] Date of Patent: Nov. 15, 1988

[54] PROCESS FOR PREPARING ZEOLITE A FROM SPENT CRACKING CATALYST

[75] Inventors: Ralph J. Bertolacini, Naperville; Eugene H. Hirschberg, Park Forest, both of Ill.

[73] Assignee: Amoco Corporation, Chicago, Ill.

[21] Appl. No.: 73,527

[22] Filed: Jul. 15, 1987

[51] Int. Cl.$^4$ .................. B01J 29/38; B01J 38/64; C01B 33/28
[52] U.S. Cl. .................. 502/25; 208/52 CT; 423/68; 423/150; 423/328; 423/329; 502/24; 502/516
[58] Field of Search .................. 502/25, 516, 79, 64, 502/69, 24; 208/52 CT, 120; 423/328 K, 329

[56] References Cited

U.S. PATENT DOCUMENTS

| | | | |
|---|---|---|---|
| 4,289,608 | 9/1981 | McArthur | 208/120 |
| 4,337,144 | 6/1982 | Yoo | 502/25 |
| 4,406,823 | 9/1983 | Laurent et al. | 502/79 |

FOREIGN PATENT DOCUMENTS 15938 4/1982 Japan .................. 502/25

Primary Examiner—Paul E. Konopka
Attorney, Agent, or Firm—Ekkehard Schoettle; William H. Magidson; Ralph C. Medhurst

[57] ABSTRACT

This invention provides for a method of preparing zeolite A from spent metals-contaminated cracking catalyst while concomitantly removing at least a portion of one of the contaminant and catalytic metals from the spent catalyst by contacting the spent catalyst with a solution containing an alkali metal hydroxide and a sufficient amount of sodium aluminate under hydrothermal conditions for a specified period of time to form the zeolite A.

6 Claims, No Drawings

PROCESS FOR PREPARING ZEOLITE A FROM SPENT CRACKING CATALYST

BACKGROUND OF THE INVENTION

The present invention provides for a method of preparing zeolite A from spent metals-contaminated cracking catalyst. Environmentally acceptable disposal of spent cracking catalyst is a matter of concern to refiners that produce large amounts of spent cracking catalyst each year.

Environmentally acceptable disposal of spent cracking catalyst is an expensive long-range proposition. Because of the high potential for metals leaching from the spent catalyst, hazardous waste landfill sites are generally required for the disposal. This is a costly solution to the disposal problem which requires constant monitoring and which may engender unforeseeable legal difficulties associated with exposure of the hazardous waste to the environment.

Zeolite A is extensively used in household detergents, separation and exchange processes. The present invention solves a potentially undesirable, environmentally difficult disposal problem and provides for the production of a useful zeolite A product.

The art is replete with various catalyst rejuvenation and reactivation processes.

U.S. Pat. No. 4,477,582 (Miale) discloses a process for reactivating a catalyst composition comprising a crystalline zeolite material having a silicon to aluminum atomic ratio of at least 3.5 where the catalyst is deactivated by contact with steam. The subject process involves contacting the steam-deactivated catalyst composition with an aqueous metal salt solution wherein the metal is selected from the group consisting of alkali, alkaline earth and transition metals. This so-contacted catalyst is then contacted with an aqueous ammonium ion solution.

U.S. Pat. No. 4,482,530 (Sanders et al.) discloses a preparation method for the zeolite Y wherein a seed quantity of zeolite Y is mixed with sodium silicate and a relatively small amount of water. This mixture is agitated for up to about 5 hours at ambient temperature. The entire system is then cooled to about −5° C. to 0° C. and sodium aluminate which has been precooled to about 0° C. is added.

U.S. Pat. No. 4,435,516 (Chang et al.) discloses a method for enhancing the activity of a high silica-containing crystalline zeolite having a silica to alumina ratio greater than 500 which involves contacting the zeolite with an ammoniacal solution of an alkali metal aluminate for a period of from ½ hour to 5 days at a temperature of from 20° to 50° C. and the pH of at least 10.

U.S. Pat. No. 4,055,482 (Robson) discloses a process for rejuvenating crystalline alumino silicate zeolite-containing catalysts which have become at least partially deactivated through use in a hydrocracking process. In particular, this patent discloses a process for preparing the crystalline alumino silicate zeolite-containing catalysts of substantial activity by treating the used catalysts in a manner such that the residual alkali metal content of the crystalline alumina silicate zeolite-containing catalysts is reduced by about 0.5 weight percent or about 30 percent of the residual alkaline metal originally present. This is accomplished by treating the crystalline alumino silicate zeolite-containing catalysts with certain ion-exchange solutions, such solutions containing hydrogen ion or hydrogen precursor ions easily convertible to hydrogen ions.

U.S. Pat. No. 3,684,738 (Chang) covers a method for reactivating a catalyst deactivated in a hydrocarbon conversion process wherein the catalyst comprises a crystalline alumino silicate zeolite which has a pore size between 5 and 13 angstroms and a silica to aluminum mole ratio of greater than 6 in combination with nickel. The reactivation is carried out without damaging the structural framework of the catalyst and without removing the nickel hydrogenation metal component from the catalyst. This is carried out by burning carbonaceous materials from the surface of the catalyst followed by contacting the catalyst with a 0.1 normal to a 0.5 normal solution of ammonium chloride.

U.S. Pat. No. 3,533,959 (Miale) relates to a process for the reactivation of spent crystalline alumina silicate catalysts with key leaching agents. The disclosed process involves contacting a catalyst comprising a crystalline alumino silicate damaged by exposure to excessive heat or steam containing entrained alumina with a cation-containing agent capable of chelating with aluminum at a pH between about 7 and about 9 where the agent is selected from the group consisting of ammonium salts of ethylene diamine tetracetic acid and diammonium, dihydrogen, ethylene, diamine and tetracetate.

U.S. Pat. No. 4,478,950 (Chu) discloses a process for enhancing the activity of a high silica containing crystalline zeolite material having a silica to alumina ratio greater than 20 which involves contacting the material with a solution containing organic cations selected from the group consisting of tetralkyammonium, cations of alkyamines and mixtures thereof of aluminum ions.

Finally, U.S. Pat. No. 3,493,490 (Plank et al.) discloses a process for the regeneration of alumino silicate catalysts wherein such catalysts are treated with anionic reagents such as liquid water, and a solution containing a hydroxyl ion from a non-alkyl-metal containing compound.

SUMMARY OF THE INVENTION

Broadly the present invention provides for a method of preparing zeolite A from spent metals-contaminated cracking catalyst while concomitantly removing at least a portion of one of the contaminant and catalytic metals from the spent catalyst. This method involves contacting the spent catalyst with a solution containing an alkali metal hydroxide and a sufficient amount of sodium aluminate under hydrothermal conditions for a specified period of time to form zeolite A. The treated catalyst is subsequently partitioned from the solution and then washed to remove residual contaminant or catalytic metals and recover zeolite A.

Detailed Description of the Invention

The present invention provides for a process that utilizes spent metals-contaminated cracking catalysts as a raw material for the preparation of zeolite A while concomitantly recovering contaminant metals and, metals originally intentionally incorporated with the catalyst, i.e., catalytic metals.

The spent cracking catalysts suitable for use in the present invention essentially comprise crystalline alumino-silicate zeolites. Typically, a type Y crystalline alumino-silicate having a silicon to aluminum molar ratio of about 2.5 is contained in the subject cracking catalysts. These catalysts have been deactivated and have had contaminant metals deposited thereof during the course of use in hydrogen conversion processes such as hydrocracking, hydrotreating, or catalytic cracking.

During use of the catalyst, its effectiveness is diminished because hydrocarbon residues in the form of coke and contaminant metals such as nickel and vanadium from the feedstock, for example, deposit and build up on its surface and in its pores. By contaminant metals, it is meant metals incidentally composited with the catalyst. In some cases, residues of the same metal which is used as a catalytic metal deposit incidentally as a contaminant metal on the catalyst. Nickel is an example of a metal which may be both a catalytic metal and a contaminant metal.

Contaminant metals may be from the feedstock, feedstock additives, or even from the hydrotreating process equipment. The coke and contaminant metals build-up reduces catalyst activity and selectivity, thereby resulting in deactivated, or spent catalyst.

In greater detail, the spent catalyst used in the process of the present invention contains aluminosilicate zeolites, which are characterized by their highly ordered crystalline structure and uniformly dimensioned pores, and which are distinguishable from each other on the basis of composition, crystalline structure, adsorption properties and the like. The term "molecular sieves" is derived from the ability of certain zeolite materials to selectively adsorb molecules on the basis of their size and form. Various types of molecular sieves may be classified according to the size of the molecules which will be rejected (i.e. not adsorbed) by a particular sieve. In addition to their extensive use as adsorbents for hydrocarbon separation processes and the like, crystalline aluminosilicate zeolites, particularly after cation exchange to reduce their initial alkali metal oxide content, are valuable catalytic material for various processes, particularly hydrocarbon conversion processes. The ion exchange of these crystalline aluminosilicate zeolites with various metals and metal ions is described, for example, in U.S. Pat. Nos. 2,971,904 and U.S. Pat. No. Re. 26,188.

In general, the chemical formula of the anhydrous form of the crystalline aluminosilicate zeolite, expressed in terms of mole ratios of oxides, may be represented as:

$$0.9 \pm 0.2 M_{2/n}O:Al_2O_3:XSiO_2$$

wherein "M" is selected from the group consisting of hydrogen, monovalent, divalent, and trivalent metal cations and mixtures thereof; "n" is its valence, and "X" is a number from about 1.5 to about 12 or greater, said value dependent upon the particular type of zeolite. The zeolite, as synthetically produced or found naturally, normally contains an alkali metal such as sodium or an alkaline earth metal such as calcium. Among the well-known naturally-occurring zeolites are mordenite, faujasite, chabazite, gemlinite, analcite, erionite, etc. Such zeolites differ in structure, composition, and particularly in the ratio of silica-to-alumina contained in the crystal lattice structure. Similarly, the various types of synthetic crystalline zeolites, e.g. synthetic faujasite, mordenite, erionite, etc. will also have varying silica-to-alumina ratios depending upon such variables as the composition of the crystallization mixture, reaction conditions, etc. Silica-to-alumina ratios higher than 12, can also be achieved through various methods for the removal of alumina from the crystal structure of the zeolite. Such zeolites having these higher silica-to-alumina mole ratios are preferred in hydrocarbon conversion processes because of their high stability at elevated temperatures. Those silica-to-alumina ratios above three are particularly preferred.

As previously mentioned the spent metals-contaminated cracking catalyst usually contains a type Y zeolite possessing a silica-to-alumina molar ratio of about 2.5.

Zeolite type A which is produced in the process of the present invention possesses a silica-to-alumina molar ratio of about 1.

The first step in the process of the present invention involves contacting the spent catalyst with a solution containing alkali metal hydroxide and sodium aluminate.

The alkali metal hydroxide, preferably sodium hydroxide, is present in the solution in an amount to effect a pH of greater than 10, preferably greater than 12.

The sodium aluminate is added in an amount sufficient to form the desired zeolite A. Preferably the sodium aluminate is present in an amount such that the silicon in the cracking catalyst to aluminum in the sodium aluminate molar ratio is less than about 5. The subject molar ratio is most preferably less than about 4.

The solution containing the spent metals-contaminated cracking catalyst is then subjected to the hydrothermal conditions set out in Table 1.

These hydrothermal conditions include a digestion step and a crystallization step, these being respectively designated as "I" and "II", and are set out below in Table 1.

TABLE 1

|  | Temp. ° C. | | Time, Hr. | | Pressure, Atm. | |
| --- | --- | --- | --- | --- | --- | --- |
|  | I | II | I | II | I | II |
| Broad: | 25–75 | 25–150 | 1–24 | 1–24 | 1–5 | 1–5 |
| Preferred: | 30–50 | 25–120 | 10–20 | 10–24 | 1–2 | 1–2 |
| Most Preferred: | 30–40 | 30–90 | 10–18 | 18–24 | atmospheric | |

Subsequent to the hydrothermal treatment the treated spent catalyst is partitioned by filtering or centrifuging in a conventional manner to remove the solution containing contaminant metals and metals originally intentionally placed on the catalyst. The solution can then be further treated to collect valuable catalytic and contaminant metals by conventional metals reclamation schemes.

Following the partition step the catalyst can be washed in water followed by a reslurrying in hot water followed by another partition step. This step is carried out at least once but may be repeated several times for optimum results. Finally, the treated catalyst is dried at a temperature from about 200° to 300° F. This final dried product comprises substantially zeolite A.

A portion of at least one contaminant or catalytic metal is removed by the process of the invention. These contaminant or catalytic metals are selected from the group consisting of vanadium, nickel, iron, copper, cobalt, molybdenum, antimony and tin. Best results are obtained with vanadium while good results are also obtained with nickel.

The present invention is described below in further detail in connection with the following examples, it being understood that the same is for purposes of illustration and not limitation.

EXAMPLE

In the present example two spent cracking catalysts were used in several runs. These spent cracking catalysts had been deactivated and had nickel and vanadium deposited upon therein during the course of a pilot plant run or plant use. These catalysts had the following compositions.

TABLE 2

| Cracking Catalyst | Wt. % $SiO_2$ | Wt. % $Al_2O_3$ |
|---|---|---|
| A | 61.6 | 31.2 |
| B | 44.3 | 46.3 |

Each run was generally carried out in the following manner. A quantity of spent catalyst was added to a three necked 500 cc round bottomed flask fitted with condenser, thermometer and stirrer. The sodium aluminate employed in the present invention was designated as Nalco 680 W and contained 46.0 wt. % $Al_2O_3$ and 31.0 wt. % $Na_2O$. Each run was carried out by adding a quantity of solution containing either NaOH or NaOH and sodium aluminate to the catalyst. The catalyst solution slurry was then stirred overnight for a period of about 16 hours at 100° F. (38° C.) in a digestion step.

The temperature was then raised to 180° F. (82° C.) and the mixture stirred for about 24 hours during the crystallization step. Subsequently the crystalline product was filtered from the mother liquor. The crystalline product was then washed in 100 cc of hot distilled water and filtered after each wash. This washing filtration step was repeated 3 times. Finally, the crystalline product was dried overnight at 250° F. (121° C.).

The following Table 3 sets out the results and respective amounts of starting materials employed with each run.

TABLE 3

| Run | Cracking Catalyst | Cracking Catalyst, g | Sodium Aluminate, g | NaOH, g |
|---|---|---|---|---|
| 1 | A | 25 | 9 | 15 |
| 2 | A | 25 | 0 | 15 |
| 3 | B | 50 | 0 | 30 |
| 4 | B | 50 | 6 | 30 |
| 5 | B | 50 | 12 | 30 |
| 6 | B | 50 | 18 | 30 |

| Run | $H_2O$ | Moles Si in Cracking Catalyst / Moles Al in Solution | XRD of product |
|---|---|---|---|
| 1 | To make 150 cc, total | 3.2 | Zeolite A |
| 2 | To make 150 cc, total | — | Amorphous |
| 3 | To make 300 cc, total | — | Zeolite P |
| 4 | To make 300 cc, total | 6.8 | Zeolite P |
| 5 | To make 300 cc, total | 3.4 | Zeolite A |
| 6 | To make 300 cc, total | 2.3 | Zeolite A |

Table 4 below sets out the degree of metals removal achieved in runs 1 and 2.

TABLE 4

| | Wt. % in Cracking Catalyst | | % Removal | | |
|---|---|---|---|---|---|
| Run | Ni | V | Ni | V | pH |
| 1 | 0.086 | 0.024 | 28.3 | 81.7 | >12 |
| 2 | 0.113 | 0.041 | 5.8 | 68.7 | >12 |

As can be seen from Table 3 above, where the process of the invention was employed in Runs 1, 5 and 6 the x-ray diffraction patterns of the final product indicated the presence of Zeolite A. For run 1 the x-ray diffraction pattern indicated a 600% increase in crystallinity compared to the spent cracking catalyst.

Thus it can be speculated that the process of the invention results in the introduction of aluminum into the framework of the crystalline structure.

It should also be noted from Table 3 that where sodium aluminate was not added or not added in the ratio stipulated by the invention, the resulting product did not contain zeolite A. Further it should be noted from Table 4, that where the solution did not contain sodium aluminate in accordance with the invention, Run 2, the percentage metals removed was significantly less than in invention Run 1.

What is claimed is:

1. A method for preparaing zeolite A from spent metals-contaminated cracking catalyst comprising zeolite Y and removing at least one metal from said catalyst which comprises the steps of:
   contacting said catalyst with a solution comprising an alkali metal hydroxide and a sufficient amount of sodium aluminate to form said zeolite A under hydrothermal conditions at a pH of at least 10;
   partitioning said catalyst from said solution;
   washing said catlayst with water to remove unreacted alkali metal hydroxide, sodium aluminate, and residual contaminant metals.

2. The method of claim 1 wherein the sodium aluminate is present in an amount such that the molar ratio of silicon in said cracking catalyst to aluminum in said amount of sodium aluminate is less than about 5.

3. The method of claim 1 wherein the sodium aluminate is present in an amount such that the molar ratio of silicon in the cracking catalyst to aluminum in said amount of sodium aluminate is less than about 4.

4. The method of claim 1 wherein said alkali metal hydroxide comprises NaOH.

5. The method of claim 1 wherein said metals are selected from the group consisting of vanadium and nickel.

6. The method of claim 1 wherein said contacting is carried out at a pH of at least 12.

* * * * *